(12) United States Patent
Stefina

(10) Patent No.: US 9,261,189 B2
(45) Date of Patent: Feb. 16, 2016

(54) GEAR SHIFT INTERLOCK

(75) Inventor: Brian K. Stefina, Waterford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 727 days.

(21) Appl. No.: 12/697,011

(22) Filed: Jan. 29, 2010

(65) Prior Publication Data

US 2010/0186532 A1    Jul. 29, 2010

Related U.S. Application Data

(60) Provisional application No. 61/206,248, filed on Jan. 29, 2009.

(51) Int. Cl.
*F16H 63/36*    (2006.01)

(52) U.S. Cl.
CPC ........... *F16H 63/36* (2013.01); *Y10T 74/20104* (2015.01)

(58) Field of Classification Search
CPC ...................................... F16H 63/36
USPC ........ 74/325, 473.11, 473.24, 473.25, 473.27
See application file for complete search history.

(56) References Cited

U.S. PATENT DOCUMENTS

| | | | | |
|---|---|---|---|---|
| 3,192,788 A | * | 7/1965 | Fodrea | 74/375 |
| 3,657,780 A | * | 4/1972 | Stolte | 29/898.066 |
| 4,296,642 A | * | 10/1981 | Schetter | 74/473.25 |
| 5,711,409 A | | 1/1998 | Murata | |
| 5,966,989 A | | 10/1999 | Reed, Jr. et al. | |
| 7,685,717 B2 | * | 3/2010 | Shibata et al. | 29/898.066 |
| 8,322,246 B2 | * | 12/2012 | Doelling et al. | 74/473.25 |
| 2005/0274218 A1 | * | 12/2005 | Birkel et al. | 74/473.24 |

FOREIGN PATENT DOCUMENTS

WO    WO 2008/002537    *    1/2008

* cited by examiner

*Primary Examiner* — William C Joyce
(74) *Attorney, Agent, or Firm* — BrooksGroup

(57) ABSTRACT

A gearshift interlock is provided including a first shift block operatively associated with at least one first synchronized gear. The first shift block has a detent and is movable between neutral and actuated positions. A second shift block is operatively associated with at least one second synchronized gear. The second shift block has a detent and is movable between neutral and actuated positions. A lockout member is provided wherein movement of one of the shift blocks from its neutral position toward its actuated position causes the shift block to urge the lockout member to engage the detent of the other one of the shift blocks. At least an outer surface of the lockout member has a hardness within a predetermined range, and each of the first and second shift blocks is hardened so as to impart a hardness within the predetermined range to at least a portion of the shift block.

6 Claims, 3 Drawing Sheets

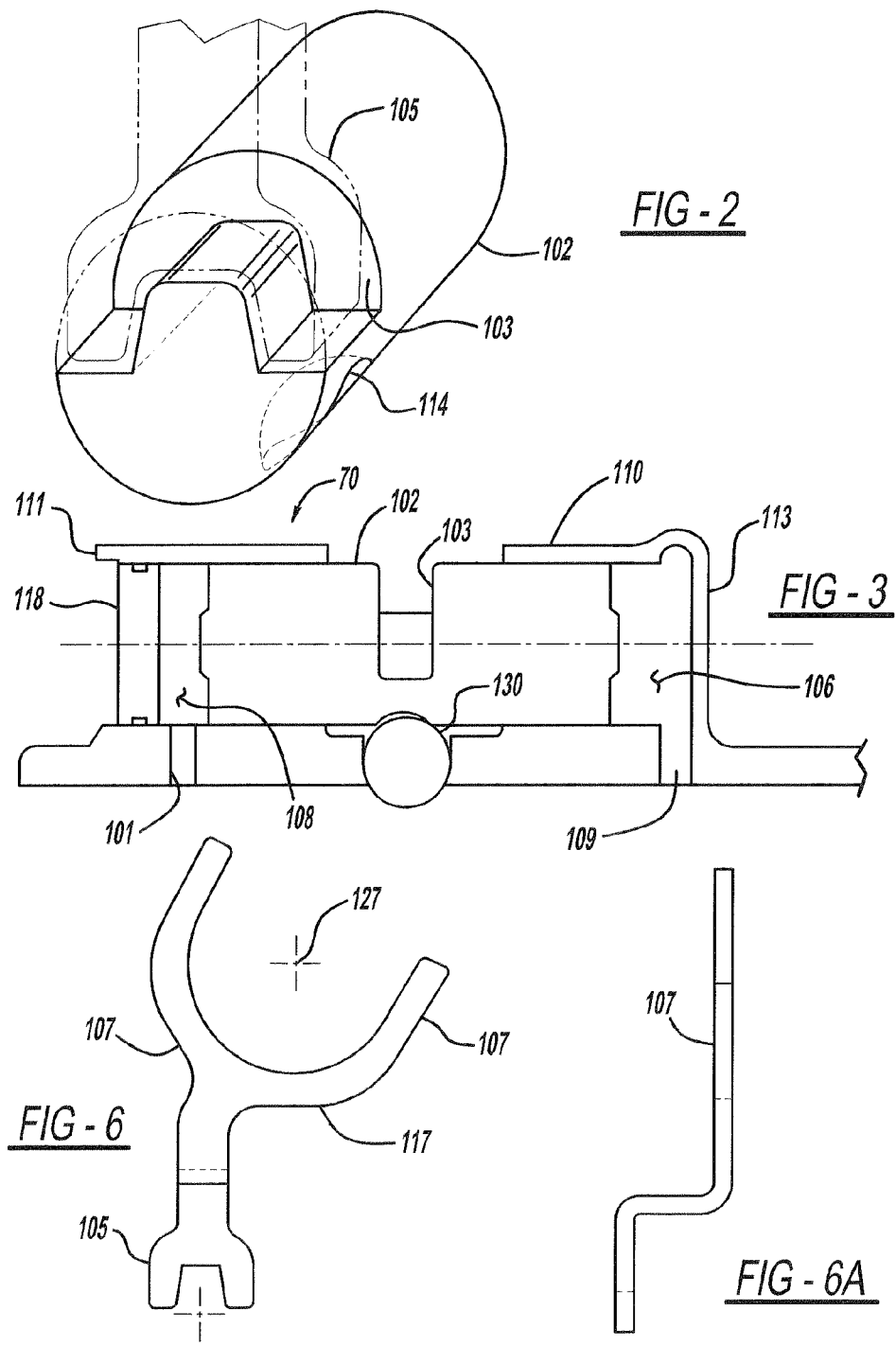

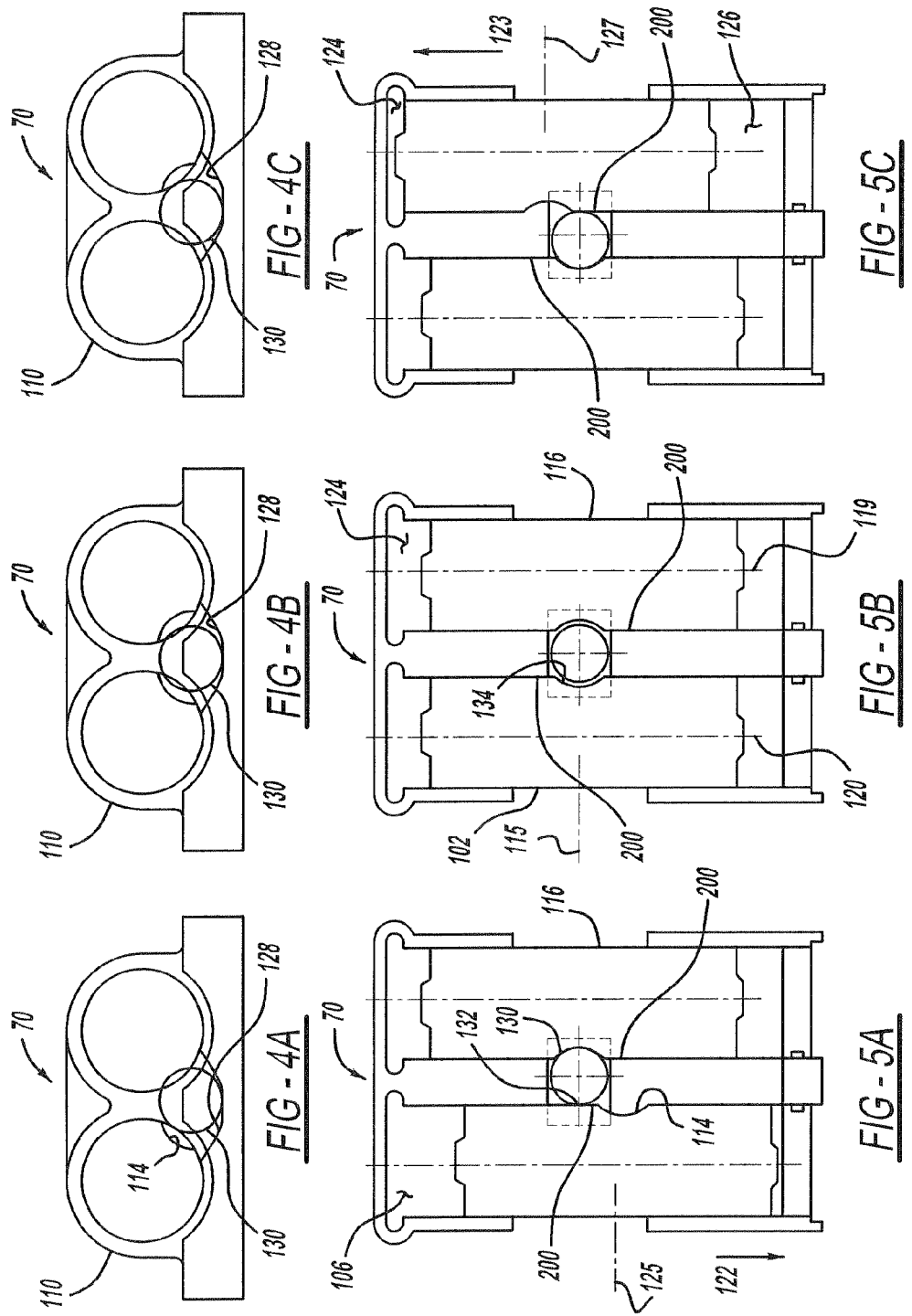

GEAR SHIFT INTERLOCK

CROSS-REFERENCE TO RELATED APPLICATIONS

This application claims the benefit of U.S. Provisional Application Ser. No. 61/206,248 filed on Jan. 29, 2009.

FIELD OF THE INVENTION

The embodiments of the present invention relate to gearshift interlocks and automotive transmissions which utilize gearshift interlocks.

BACKGROUND OF THE INVENTION

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first and oldest type is the manually operated transmission. These transmissions include a foot-operated startup or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever, and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second, and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop-and-go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel that is generally considered to be unacceptable when compared to smooth shift feel associated with most conventional automatic transmissions.

To overcome this problem, other automated manual type transmissions have been developed that can be power-shifted to peonit gearshifts to be made,under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966, 989 issued on Apr. 4, 2000 to Reed, Jr. et al for an Electro-mechanical Automatic Transmission having Dual Input Shafts. These particular types of automated manual transmissions have two clutches and are generally referred to simply as dual, or twin, clutch transmissions. The dual clutch structure is most often coaxially and cooperatively configured so as to derive power input from a single engine flywheel arrangement. However, some designs have a dual clutch assembly that is coaxial but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electromechanical type, since a lubrication system within the transmission requires a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform upshifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

In the above noted transmission, synchronizer mechanisms for the 1-3 gear combination, 2-R gear combination and 4-6 gear combination are often associated with one another. It is desirable to provide an interlock arrangement for the synchronizer mechanisms to prevent simultaneous engagement of associated gears. Such an interlock arrangement may include components that engage each other and move relative to each other. Due to the frequency with which the various gears are engaged and disengaged and the contact forces between the interlock components, relative motion between the interlock components may abrade the components or otherwise produce degradation of the component contact surface finishes and/or surface quality. Such degradation may impair the functioning of the interlock. Therefore, it is desirable to provide an interlock design having engaging components with a relatively high resistance to contact surface degradation.

SUMMARY OF THE INVENTION

In one aspect of embodiments of the present invention, a gearshift interlock is provided including a first shift block operatively associated with at least one first synchronized gear, and a second shift block operatively associated with at least one second synchronized gear. The first shift block is movable between neutral and actuated positions, and has a detent. The second shift block is movable between neutral and actuated positions, and also has a detent. A lockout member is provided wherein movement of one of the shift blocks from its neutral position toward its actuated position causes the shift block to urge the lockout member to engage the detent of the other one of the shift blocks to prevent movement of the other one of the shift blocks. At least an outer surface of the lockout member has a hardness within a predetermined range, and wherein each of the first and second shift blocks is hardened so as to impart a hardness within the predetermined range to at least a portion of the shift block.

In another aspect of embodiments of the present invention, a method of interlocking the operation of two synchronized gears on a common shaft of an automotive transmission is provided, including the steps of providing a lockout member wherein at least an outer surface of the lockout member has a hardness within a predetermined range; providing a first shift block operatively associated with at least one first synchronized gear of the two synchronized gears, the first shift block being hardened so as to impart a hardness within the predetermined range to at least a portion of the block, the first shift block being hydraulically movable in a first direction between neutral and actuated positions, the first shift block having detent formed thereon; providing a second shift block operatively associated with at least one second synchronized gear of the two synchronized gears, the second shift block being hardened so as to impart a hardness within the predetermined range to at least a portion of the block, the second shift block being hydraulically movable in a second direction opposite the first direction between neutral and actuated positions, the second shift block having a detent formed thereon, the second shift block been positioned adjacent the first shift block; and moving of one of the shift blocks from its neutral position toward its actuated position, causing the one of the shift blocks to urge a lockout member to engage the detent formed on the other one of the shift blocks to prevent movement of other one of the shift blocks.

In another aspect of embodiments of the present invention, a dual input transmission with a gearshift interlock is provided including a lockout member having a hardness within a predetermined range, and a first shift block operatively associated with at least one first synchronized gear. At least a portion of the first shift block has a hardness within the predetermined range. The first shift block is movable between neutral and actuated positions and has a detent. A second shift block is operatively associated with at least one second synchronized gear. At least a portion of the second shift block has a hardness within the predetermined range. The second shift block is movable between neutral and actuated positions and also has a detent. Movement of one of the shift blocks from its neutral position toward its actuated position cause the shift block to urge the lockout member to engage the detent of the other one of the shift blocks to prevent movement of the other one of the shift blocks.

BRIEF DESCRIPTION OF THE DRAWINGS

FIG. 2 is a partial perspective view of a shift fork connection with a shift block of a gearshift interlock in accordance with one embodiment of the present invention.

FIG. 3 is a side schematic view of a gearshift interlock in accordance with one embodiment of the present invention.

FIGS. 4A-4C are schematic front views illustrating operation of the gearshift interlock shown in FIG. 2.

FIGS. 5A-5C are schematic top views illustrating operation of the gearshift interlock shown in FIG. 2.

FIGS. 6 and 6A are front and side elevation views of a shift fork shown in FIG. 2.

DETAILED DESCRIPTION OF THE INVENTION

Figure 1:
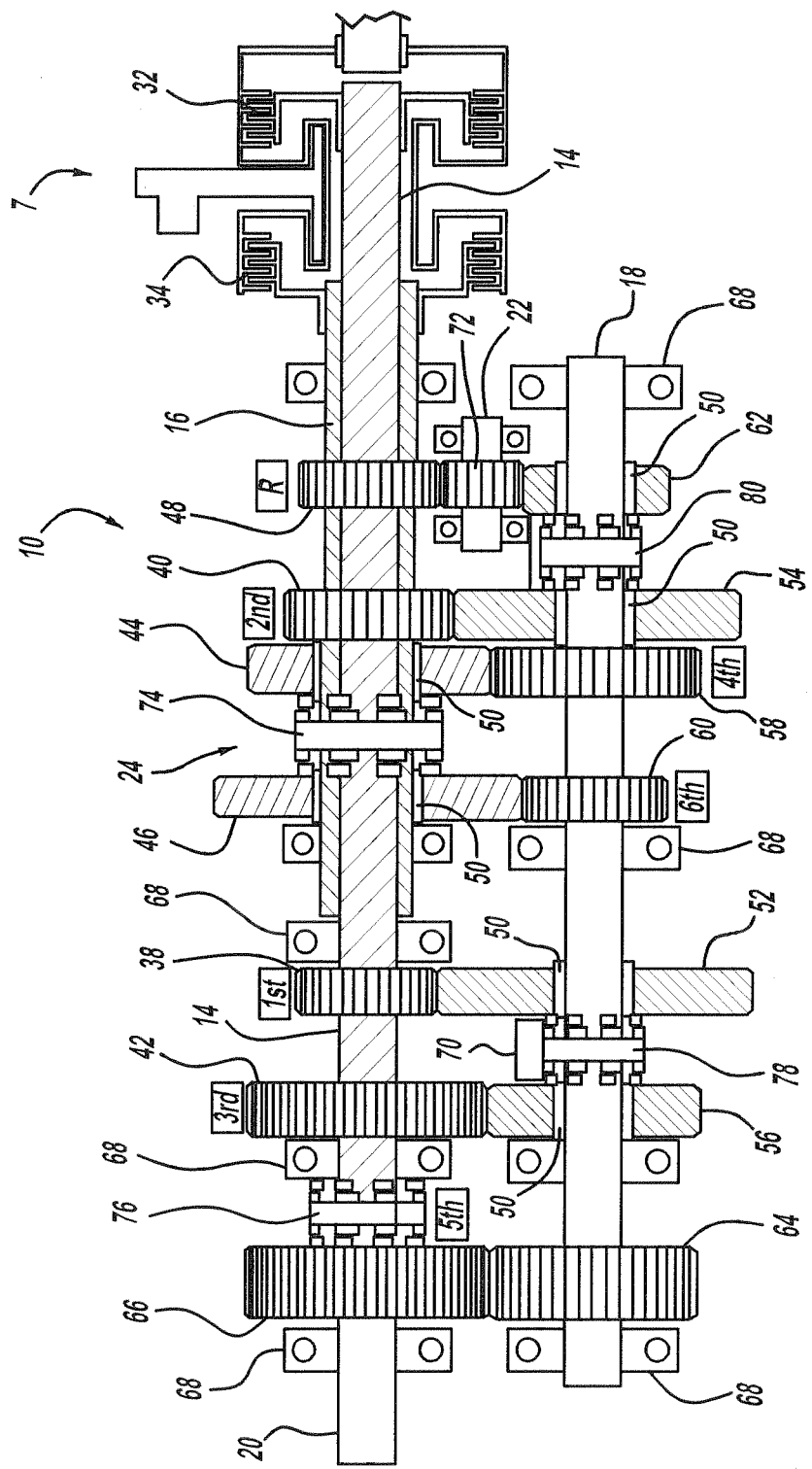
FIG. 1 is a schematic view of a dual clutch transmission utilizing a gearshift interlock in accordance with one embodiment of the present invention.

A representative dual clutch transmission that may be used with a gearshift interlock of the embodiments of the present invention is generally indicated at 10 in the schematic illustrated in FIG. 1. Specifically, as shown in FIG. 1, the dual clutch transmission 10 includes a dual, coaxial clutch arrangement including clutch mechanisms 32 and 34, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24, and a plurality of shift actuators generally (not shown).

The dual clutch transmission 10 forms a portion of a vehicle powertrain and is responsible for taking a torque input from a prime mover, such as an internal combustion engine, and transmitting the torque through selectable gear ratios to the vehicle drive wheels. The dual clutch transmission 10 operatively routes the applied torque from the engine through the dual, coaxial clutch arrangement 7 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratio sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators to selectively engage one of the gear ratio sets. Thus, torque is transferred from the engine to the dual, coaxial clutch arrangement 7, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch arrangement 7 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and axially spaced from one another such that the clutch housing of the first clutch mechanism 32 is in front of the clutch housing of the second clutch mechanism 34. The first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly supported on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

The counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and sixth counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 utilized to shift through the six forward gears and reverse. It should be appreciated that there are a variety of known types of synchronizers that are capable of engaging a gear to a shaft and that the particular type employed for the purposes of this discussion is beyond the scope of the embodiments of the present invention. Generally speaking, any type of synchronizer that is movable by a shift fork or like device may be employed. As shown in the representative example of FIG. 1, the synchronizers (with the exception of synchronizer 76) are dual actuated synchronizers, such that they selectively engage one of two separate gears to the same respective shaft. Specifically with reference to the example illustrated in FIG. 1, synchronizer 78 can engage the first counter gear 52 on the counter shaft 18 or engage the third counter gear 56. Synchronizer 80 can engage the reverse counter gear 62 or engage the second counter gear 54. Likewise, synchronizer 74 can engage the fourth input gear 44 or engage the sixth input gear 46. Single acting synchronizer 76 can selectively connect the end of the first input shaft 14 to the output shaft 20 thereby providing a direct 1:1 (one to one) drive ratio for fifth gear. It should be appreciated that this example of the dual clutch transmission is representative and that other gear set, synchronizer, and shift actuator arrangements are possible within the dual clutch transmission 10 as long as the even and odd gear sets are disposed on opposite input shafts.

To actuate the synchronizers 74, 76, 78, and 80, this representative example of a dual clutch transmission 10 utilizes hydraulically driven shift actuators with attached shift forks. The dual actuated synchronizers 78, 74 and 80 all incorporate a gearshift interlock 70 (only the gearshift interlock for the synchronizer 78 is shown for clarity of illustration) of the embodiments of the present invention to prevent inadvertent simultaneous multiple gear engagement.

Referring to FIGS. 2-5C, 6, and 6A the gearshift interlock arrangement 70 of one embodiment of the present invention generally includes a first shift block 102, a second shift block 116, and a lockout member (generally designated 130). The shift blocks may be operatively coupled to a hydraulic control body (not shown) which regulates a flow of hydraulic fluid to the shift blocks, thereby enabling application of selective hydraulic pressure to the shift blocks to create a forces delivered to the transmission shift forks. In a particular embodiment, the hydraulic control body regulates a flow of hydraulic fluid to associated control volumes (as described below) positioned at opposite ends of the shift blocks, thereby enabling application of selective hydraulic pressure to shift blocks. A detent, generally designated 114, is integrally formed in each of shift blocks 102 and 116 for receiving a portion of the lockout member therein. In the embodiment shown in FIGS. 2-5C, detents 114 are substantially conical. As seen in FIG. 5B, a detent 114 is formed in each of shift blocks 102 and 116 such that, when the blocks reside in a neutral position 115, detents 114 are arranged opposite each other with a portion of lockout member 130 residing in each of the detents. As described in greater detail below, when one of shift blocks 102 and 116 is actuated to engage an associated gear, lockout member 130 is urged out of the detent formed in the actuated shift block and slides along an outer surface of the shift block adjacent the detent during actuation of the block.

In embodiments of the present invention disclosed herein, lockout member 130 and shift blocks 102 and 116 are fabricated so as to maximize the resistance of the lockout member-shift block contact interfaces to abrasion, spalling, and other modes of surface degradation resulting from contact between the shift blocks and the lockout member. In particular embodiments, a lockout member 130 and shift blocks 102 and 116 are provided having compatible surface hardnesses, at least along the contact areas between the lockout member and shift blocks. The surface hardnesses of the lockout member 130 and/or shift blocks 102 and 116 may be adjusted according to the requirements of a particular application to maximize resistance of the contact surfaces to contact-induced surface degradation.

The first shift block 102 is operatively associated with a first synchronized gear 56. The first shift block 102 has a cut out 103 formed to accept a foot 105 of a shift fork 107. The shift block 102 is linearly slideably mounted in a housing 110 having a closed end 113 and an open end 111. Adjacent the open end 111 is a blind flange 118. The first shift block 102 is sealed within a first control volume 106 along a first extreme end, and a second control volume 108 along a second extreme end. The first shift block 102 has a neutral position 115 as shown in FIGS. 4B and 5B. To hydraulically move the shift block 102 to a fully actuated position 125, the control volume 106 is pressurized (via an inlet/outlet line 109) and/or the controlled volume 108 is depressurized (via an inlet/outlet line 101). The shift block 102 will move in a direction of arrow 122 to the position 125. To return the shift block 102 to the neutral position 115, the control volume 108 is pressurized and/or the control volume 106 is depressurized.

The second shift block 116 is operatively associated with a second synchronized gear 52 (via a shift fork, not shown) that is a mirror image of the shift fork 107. The shift forks have axially and laterally offset collars 117 allowing a centerline 127 of the collars to be axially aligned with each other. The second shift block 116 is typically a mirror image the first shift block 102 and as shown in FIGS. 4B and 5B shares a common neutral position 115. The second shift block 116 is hydraulically moved along a path 119 that is parallel to a path 120 of travel for the first shift block 102. Actuation of the second shift block 116 causes the second shift block 116 to move in a direction of arrow 123 opposite of that of arrow 122 to a position 123. The second shift block 116 is sealed along its extreme ends in control volumes 124 and 126.

Prior to incorporation of the shift blocks 102 and 116 into a gear shift interlock arrangement in accordance with an embodiment of the present invention, the shift blocks are hardened to prevent damage to surfaces of the block which contact lockout member 130 during actuation of the shift block. Shift blocks 102 and 116 may be hardened using any of a variety of methods, depending on such factors as the material from which the shift blocks are formed and the hardness required. Methods such as various types of heat treatment, various types of work or strain hardening (e.g., forging), and other suitable hardening methods are contemplated. In a particular embodiment, a hardened roller is applied to a portion of the shift block surface which contacts the lockout member 130, to locally or selectively work harden the shift block-lockout member bearing surface.

Depending upon the method(s) used to harden the shift block material, the material may be surface hardened along the surfaces that are in contact with lockout member 130 during actuation of the shift block. Alternatively, the entire surface of the shift block may be hardened, or the block material may be surface hardened and also hardened to a substantial depth below the outer surface of the shift block. In a particular embodiment, the detent portions of the shift blocks and the surfaces (designated 200 in FIGS. 5A-5C) of the shift blocks adjacent the detents are selectively hardened to improve surface degradation resistance in the specific regions of contact between the shift blocks and the lockout member.

Shift blocks 102 and 116 may be formed from any metal or metal alloy suitable for work or strain hardening to the degree necessary to support lockout member 130 during relative motion between the lockout member and the shift block, while limiting or eliminating deformation, galling, spalling, or other types of degradation of the contact surfaces of either the shift block or the lockout member. The material used for the shift blocks may also be selected for such characteristics as wear resistance, surface quality (i.e., the absence of cuts, scratches, scuffs, and other breaks in surface continuity), and surface finish or suitability for finishing to a smooth surface. In a particular embodiment, shift blocks 102 and 116 are formed from an aluminum alloy.

Positioned between the shift blocks 102 and 116 in a concave seat 128 is a lockout member 130. In the embodiment shown in FIGS. 4-5C, lockout member 130 is a spherical lockout member or ball. When the shift blocks 102 and 116 are in the neutral positions as shown in FIGS. 4B and 5B the lockout ball 130 is positioned generally within both of the detents 114 (with a slight amount of clearance 134 with both detents 114). When the shift block 102 is moved in the direction of arrow 122 during activation, a ride out surface 132 of the shift block 102 urges the lockout ball 130 fully into the detent 114 of the second shift block 116. With the lockout number 130 fully engaged within the detent 114 of the second shift block 116, the second shift block 116 is locked out from movement (FIGS. 4A and 5A). Consequently, the gear 52 associated with the second shift block 116 cannot be engaged. When the first shift block 102 is returned to its neutral position 115 shown in FIGS. 4B and 5B, the locking ball slight clearance 134 with the detents 114 is restored. From the neutral position 115 the second shift block 116 and its associated gear can be engaged causing the lockout ball to 130 fully engage with the detent 114 of the first shift block 102 and the first block 102 and its associated gears is blocked from engagement (FIGS. 4C and 5C).

Lockout member 130 may be formed from any material having a hardness (or amenable to hardening to a hardness) suitable for repeated sliding engagement with shift blocks 102 and 116 without producing galling, spalling, or other surface degradation of either the shift blocks surface or the lockout member. The material used may also be selected for such characteristics as mass, wear resistance, surface quality (i.e., the absence of cuts, scratches, scuffs, and other breaks in surface continuity), and surface finish or suitability for finishing to a smooth surface. In a particular embodiment, lockout member 130 is formed from a ceramic material. Spherical ceramic lockout members having suitable diameters, hardnesses, compositions, maximum surface roughnesses, surface qualities, and other design parameters are commercially available at vendors such as Boca Bearing Co. of Delray Beach, Fla., and Saint Gobain Ceramics CERBEC® USA of East Granby, Conn.

Lockout member 130 and detents 114 may have shapes other than those described above.

It should be understood that the preceding is merely a detailed description of various embodiments of this invention and that numerous changes to the disclosed embodiments can be made in accordance with the disclosure herein without departing from the spirit or scope of the invention. The preceding description, therefore, is not meant to limit the scope of the invention.

What is claimed is:

1. A gearshift interlock comprising:
a first shift block operatively associated with at least one first synchronized gear, the first shift block being movable between neutral and actuated positions, the first shift block having a detent;
a second shift block operatively associated with at least one second synchronized gear, the second shift block being movable between neutral and actuated positions, the second shift block having a detent;
a lockout member, wherein the lockout member is a ceramic spherical ball, wherein movement of the first shift block from its neutral position toward its actuated position causes the first shift block to urge the lockout member to engage the detent of the second shift block to prevent movement of the second shift block to its actuated position, and wherein movement of the second shift block from its neutral position toward its actuated position causes the second shift block to urge the lockout member to engage the detent of the first shift block to prevent movement of the first shift block to its actuated position; wherein at least an outer surface of the lockout member has a hardness within a predetermined range, wherein at least one of the first and second shift blocks is formed from an aluminum alloy, and wherein each of the first and second shift blocks is hardened so as to impart a hardness within the predetermined range to at least a portion of the shift block, wherein each of the first and second shift blocks is hardened selectively along only a portion of the block which engages the lockout member, and wherein at least one of the first and second blocks is hardened by work hardening.

2. The gearshift interlock of claim 1 wherein the at least one of the first and second blocks is hardened by applying a hardened roller, to a surface of the portion of the block which engages the lockout member, to harden the surface.

3. The gearshift interlock of claim 1 wherein the degree of hardness imparted to the first and second shift blocks is such that the shift blocks are resistant to surface degradation caused by engagement with the lockout member.

4. The gearshift interlock of claim 1 wherein the lockout member is formed from silicon nitride.

5. The gearshift interlock of claim 1 wherein the lockout member is formed from alumina oxide.

6. The gearshift interlock of claim 1 wherein at least one of the first shift block and the second shift block is operatively coupled to a hydraulic control body for regulating hydraulic pressure applied to the at least one of the first shift block and the second shift block to move the at least one of the first shift block and the second shift block between the neutral and actuated positions.

* * * * *